US011885099B2

(12) United States Patent
Orimoto et al.

(10) Patent No.: US 11,885,099 B2
(45) Date of Patent: Jan. 30, 2024

(54) DRIFT-PREVENTION VALVE DEVICE, BLADE DEVICE, AND WORKING MACHINE

(71) Applicant: Caterpillar SARL, Geneva (CH)

(72) Inventors: Shuhei Orimoto, Akashi (JP); Koichi Kiyasu, Akashi (JP); Hiroshi Maeda, Kako-gun (JP)

(73) Assignee: Caterpillar SARL, Geneva (CH)

( * ) Notice: Subject to any disclaimer, the term of this patent is extended or adjusted under 35 U.S.C. 154(b) by 470 days.

(21) Appl. No.: 17/286,365

(22) PCT Filed: Oct. 15, 2019

(86) PCT No.: PCT/EP2019/025349
§ 371 (c)(1),
(2) Date: Apr. 16, 2021

(87) PCT Pub. No.: WO2020/078586
PCT Pub. Date: Apr. 23, 2020

(65) Prior Publication Data
US 2021/0372085 A1 Dec. 2, 2021

(30) Foreign Application Priority Data
Oct. 17, 2018 (JP) ................................ 2018-196058

(51) Int. Cl.
*E02F 9/22* (2006.01)
*F15B 11/00* (2006.01)
(Continued)

(52) U.S. Cl.
CPC .............. *E02F 9/085* (2013.01); *E02F 3/964* (2013.01); *E02F 9/2267* (2013.01);
(Continued)

(58) Field of Classification Search
CPC ...... F15B 11/003; F15B 15/202; F15B 15/26; F15B 2211/3051; F15B 2211/30515;
(Continued)

(56) References Cited

U.S. PATENT DOCUMENTS 3,273,467 A * 9/1966 Allen ...................... F15B 13/01 91/464
4,250,794 A * 2/1981 Haak .................. F15B 13/0405 91/453
(Continued)

FOREIGN PATENT DOCUMENTS

DE 3900344 A1 * 7/1990 ............ F15B 15/202
DE 102005063229 A1 6/2007
(Continued)

OTHER PUBLICATIONS

International Search Report for related Application No. PCT/EP2019/025349; dated Jan. 17, 2020.
Examination Report for Int'l. Patent Appln. No. 112019004752.3, dated Jan. 13, 2023 (9 pgs).

*Primary Examiner* — Michael Leslie

(57) ABSTRACT

To provide a drift-prevention valve device, a blade device, and a working machine capable of operating an actuated unit and preventing the machine body from drifting with a simple configuration. The drift-prevention valve device is provided with a non-return valve 41 that allows the flow of hydraulic oil from a control valve 28 to a head chamber 34*h* of a blade cylinder 34 and blocks the flow of the hydraulic oil in the reverse direction; and a piston accommodation part 42 separately disposed from an accommodation part 70 of the non-return valve 41, configured to movably accommodate a power piston 43. The power piston 43 defines a first piston chamber 42*p*1 communicating with a rod chamber of 34*r* of the blade cylinder 34 and a second piston chamber 42*p*2 for drain positioned on a poppet 71 side of the non-return valve 41 and communicating with a tank 52. The power piston 43
(Continued)

is connected to the poppet 71 of the non-return valve 41, so that the power piston 43 can be operated by the difference between the urging force of the poppet 71 by a spring 72 of the non-return valve 41 and a rod chamber pressure of the blade cylinder 34.

10 Claims, 7 Drawing Sheets

(51) Int. Cl.
*F15B 15/20* (2006.01)
*E02F 9/08* (2006.01)
*E02F 3/96* (2006.01)
*F15B 13/04* (2006.01)

(52) U.S. Cl.
CPC .......... *E02F 9/2271* (2013.01); *E02F 9/2282* (2013.01); *E02F 9/2285* (2013.01); *F15B 11/003* (2013.01); *F15B 13/0401* (2013.01); *F15B 15/202* (2013.01); *F15B 2211/30515* (2013.01); *F15B 2211/3127* (2013.01); *F15B 2211/329* (2013.01)

(58) Field of Classification Search
CPC ............ F15B 2211/3127; E02F 9/2267; E02F 9/2275; E02F 9/2282; E02F 9/2285
See application file for complete search history.

(56) References Cited

U.S. PATENT DOCUMENTS

| | | | | | |
|---|---|---|---|---|---|
| 5,575,150 | A * | 11/1996 | Vieten | B64C 13/504 91/465 |
| 9,068,322 | B2 * | 6/2015 | Park | F15B 13/015 |
| 11,466,706 | B2 * | 10/2022 | Fujiwara | F15B 11/003 |
| 2004/0112208 | A1 * | 6/2004 | Kot, II | F15B 13/01 91/420 |
| 2008/0143176 | A1 | 6/2008 | Hsu | |
| 2019/0203743 | A1 * | 7/2019 | Serricchio | F15B 13/01 |

FOREIGN PATENT DOCUMENTS

| | | | | |
|---|---|---|---|---|
| EP | 0066151 | A2 | 12/1982 | |
| EP | 2589823 | A1 | 5/2013 | |
| EP | 3081819 | B1 | 5/2018 | |
| EP | 3604685 | B1 | 12/2021 | |
| FR | 2479358 | A1 * | 10/1981 | F15B 13/015 |
| FR | 2487019 | A2 * | 1/1982 | F15B 11/003 |
| JP | 51-17826 | U | 7/1949 | |
| JP | S4892927 | A | 12/1973 | |
| JP | 57048303 | | 3/1982 | |
| JP | 61082105 | | 5/1986 | |
| JP | H066247 | Y2 | 2/1994 | |
| JP | H11336116 | A | 12/1999 | |
| JP | 2002-88796 | A | 3/2002 | |
| JP | 2003261959 | | 9/2003 | |
| WO | 9523925 | W | 9/1995 | |

* cited by examiner

DRIFT-PREVENTION VALVE DEVICE, BLADE DEVICE, AND WORKING MACHINE

This patent application is a 35 USC § 371 U.S. national stage of International Application No. PCT/EP2019/025349 filed on Oct. 15, 2019, which claims the benefit and priority of Japanese Application No, 2018-196058 filed on Oct. 17, 2018, the disclosures of which are incorporated in their entirety by reference herein.

TECHNICAL FIELD

The present invention relates to a drift-prevention valve device mounted on a fluid-pressure cylinder configured to cause an activated unit to move upward and downward, a blade device having the drift-prevention valve device, and a working machine having the same.

BACKGROUND ART

Conventionally, in working machines, for example such as hydraulic shovels, there are some provided with a blade device for earth removal work. The blade device may be used as an outrigger that causes the blade to be grounded when performing excavating an operation with a bucket, for example, and causes a reaction force from the ground associated with the excavation operation to act on a machine body to make the machine body hard to incline. In case where the blade device is used as the outrigger in this manner, it is required to prevent the blade cylinder from contracting and the machine body from gripping even if a damage should occur to piping connected to the blade cylinder.

A configuration is known for preventing an arm cylinder from drifting by switching a pilot-type switch valve by a pilot pressure supplied from a pilot line, in response to spool switching of a control valve, for example. (see e.g. Patent Literature 1). In addition, a configuration is known for providing a pilot check valve that can switch opening and closing by a pilot pressure supplied from a pilot line in a passage communicating between the rod chamber and the control valve, with respect to the blade cylinder, for example, and thereby preventing the blade from drifting. (see e.g. Patent Literature 2).

However, in the case of the blade cylinder, because it is disposed in the lower traveling body of the machine body, it is close to the ground, and the piping therein is more likely to be damaged by sediments or rocks, etc. compared to the piping in the upper swing body, and it is hard to additionally provide hydraulic piping, and further it is configured such that pressurized oil is supplied from the control valve via a swivel joint that connects the hydraulic piping between the upper swing body and the lower traveling body of the machine body. As a result, in view of the cost and layout, when providing a valve for preventing the machine body from drifting, it is desirable to enable prevention of the machine body from drifting without adding new ports for the hydraulic lines or pilot lines to the swivel joint.

In this regard a configuration is known f r throttling the supply of the hydraulic oil to the rod chamber of the blade cylinder when the blade is lowered, using a pilot operated non-return valve supplied with a rod side pressure as a pilot pressure, for example. (see e.g. Patent Literature 3). In this configuration, because the control valve and the head chamber of the hydraulic cylinder are directly connected by piping, if a damage should occur to this piping, the hydraulic oil will flow out from the head chamber, and thereby it becomes difficult to prevent the machine body from drifting.

Further, a configuration is known for connecting the control valve to the head chamber and the rod chamber of the hydraulic cylinder respectively, using a pilot operated non-return valve supplied with a head side pressure as a pilot pressure, for example, (see e.g. Patent Literature 4). In this configuration, when a piston of the pilot operated non-return valve pushes the poppet in the valve opening direction, the head side pressure and the rod side pressure will be applied to the piston, and it is difficult to obtain an appropriate operation of the piston

PRIOR ART LITERATURES

Patent Literatures

[Patent Literature 1] Japanese Utility Model Publication No. 6-6247

[Patent Literature 2] Japanese Patent Application Laid-Open No. 11-336116

[Patent Literature 3] Japanese Utility Model Application Laid-Open No. 1976-17826

[Patent Literature 4] Japanese Patent Application Laid-Open No. 1973-92927

SUMMARY OF THE INVENTION

Problems to be Solved by the Invention

As described above, it is required to operate an actuated unit such as a blade and prevent the machine body from drifting without incurring complicated hydraulic lines and pilot lines and similar lines in association with their additions.

The present invention has been made in view of the above points, and has an object of providing a drift-prevention valve device capable of operating an activated unit with a simple configuration, a blade device having the drift-prevention valve device, and a working machine having the same.

Means for Solving the Problems

The present invention according to a first aspect is a drift-prevention valve device mounted on a fluid-pressure cylinder configured to actuate the actuated unit by being extended/contracted by supply/discharge of working fluid from a control valve to a first fluid chamber for supporting operation of a machine body by an actuated unit and a second fluid chamber opposed thereto, the drift-prevention valve device comprising a non-return valve including an accommodation part configured to communicate between the control valve and the first fluid chamber of the fluid-pressure cylinder, a valve element movably accommodated in the accommodation part, and an urging member for urging the valve element in a valve closing direction, configured to allow a flow of working fluid from the control valve to the first fluid chamber of the fluid-pressure cylinder and check the flow of the working fluid in the reverse direction; a piston accommodation part provided separately from the accommodation part of the non-return valve; and a power piston movably accommodated in the piston accommodation part, configured to define in the piston accommodation part, a first piston chamber communicating with the second fluid chamber of the fluid-pressure cylinder and a second piston chamber for draining located on the valve element side of the non-return valve and communicating with the tank, and further connected to the valve element of the non-return valve, and further connected to the valve element of the non-return valve, and operable by a difference between an urging force of the valve element by the urging member of the non-return valve and a second fluid chamber pressure of the fluid-pressure cylinder.

A drift-prevention valve device according to a second aspect of the present invention is the drift-prevention valve device according to the first aspect, further comprising a valve main body incorporating the non-return valve, the piston accommodation part, and the power piston, and further including therein a passage configured to directly communicate between the accommodation part of the non-return valve and the first fluid chamber of the fluid-pressure cylinder, and directly mounted on the fluid-pressure cylinder.

A drift-prevention valve device according to a third aspect of the present invention is the drift-prevention valve device according to the first aspect or a second aspect, wherein the valve element of the non-return valve and the power piston are provided as a separate construction from each other.

A drift-prevention valve device according to a fourth aspect of the present invention is the drift-prevention valve device according to any one of the first aspect through the third aspect, wherein the non-return valve is a pilot operated non-return valve that accommodates the urging member and further has in the accommodation part, a back pressure chamber that can be supplied with a first fluid chamber pressure of the fluid-pressure cylinder.

A drift-prevention valve device according to a fifth aspect of the present invention is the drift-prevention valve device according to the fourth aspect, further including a relief valve configured to open when the first fluid chamber pressure of the fluid-pressure cylinder reaches a preset relief pressure; and a selector valve configured to be switchable between a position for communicating between the back pressure chamber and the first fluid chamber of the fluid-pressure cylinder and a position for communicating between the back pressure chamber and the tank, by being pilot operated by the hydraulic oil from the first fluid chamber pressure of the fluid-pressure cylinder flowing out from the relief valve.

A drift-prevention valve device according to a sixth aspect of the present invention is the drift-prevention valve device according to the fourth or fifth aspect, each mounted on paired fluid-pressure cylinders, including a balance line communicating between the first fluid chambers of paired fluid-pressure cylinders, and a fuse valve provided in the balance line, configured to close when a front-rear differential pressure reaches a predetermined pressure that has been determined in advance.

A drift-prevention valve device according to a seventh aspect of the present invention is the drift-prevention valve device according to any one of the fourth aspect through the sixth aspect, wherein an area with which the power piston receives the second fluid chamber pressure of the fluid-pressure cylinder is greater than an area with which the valve element of the non-return valve receives the first fluid chamber pressure of the fluid-pressure cylinder.

A blade device according to an eighth aspect of the present invention is the blade device including a blade serving as an actuated unit; a connecting arm for joint connecting the blade to the machine body so as to be movable upward and downward; a fluid-pressure cylinder including a head chamber serving as a first fluid chamber, and a rod chamber serving as a second fluid chamber, configured to move the blade upward and downward by its extension and contraction, the drill-prevention valve device according to any one of a first aspect through a seventh aspect mounted on the fluid-pressure cylinder; and a control valve configured to control the direction and flow rate of the working fluid supplied to and discharged from the head chamber and rod chamber of the fluid-pressure cylinder.

A working machine according to a ninth aspect of the present invention is the working machine including a machine body; and the blade device according to the eighth aspect provided on the machine body.

A working machine according to a tenth aspect of the present invention is the working machine according to the ninth aspect wherein the machine body includes a lower traveling body including the blade connected thereto by the connecting arm of the blade device and the fluid-pressure cylinder disposed therein; an upper swing body having a control valve of the blade device disposed therein and swingably provided on the lower traveling body; and a swivel joint disposed at the center of swing of the upper swing body, configured to connect the control valve to the drift-prevention valve device and the fluid-pressure cylinder respectively.

Advantageous Effects of the Invention

According to the first aspect of the present invention, the power piston, on which fluid-pressure does not act from the second piston chamber on the valve element side of the non-return valve, is connected to the valve element of the non-return valve. Consequently, when the working fluid is supplied from the control valve to the second fluid chamber side of the fluid-pressure cylinder, the second fluid chamber pressure of the fluid-pressure cylinder exceeds the urging force of the valve element by the urging member of the non-return valve, the valve element of the non-return valve is moved in the valve opening direction by the power piston, and the working fluid can be discharged from the first fluid chamber of the fluid-pressure cylinder to the control valve. Also, if the working fluid is supplied from the control valve to the first fluid chamber side of the fluid-pressure cylinder, then the valve element moves in the valve opening direction against the urging force of the valve element by the urging member of the non-return valve. The working fluid can be supplied to the first fluid chamber of the fluid-pressure cylinder. Further, for example, if a damaged occurs to a passage connecting between the accommodation part of the non-return valve and the control valve, the valve element of the non-return valve is held in the valve closing direction by the urging force by the urging member, and the discharge of the working fluid from the first fluid chamber of the fluid-pressure cylinder to the control valve is blocked, so that the actuated unit does not release the support of the machine body. Therefore, it is made possible to operate the actuated unit and prevent drifting of the machine body supported by the actuated unit with a simple configuration, without the need to newly add a pilot line or the like from the control valve side.

According to the second aspect of the present invention, by directly connecting the valve main body incorporating the non-return valve, the piston accommodation part, and the power piston to the fluid-pressure cylinder, and forming therein a passage directly communicating between the accommodation part of the non-return valve and the first fluid chamber of the fluid-pressure cylinder, piping for connecting the accommodation part and the first fluid chamber of the fluid-pressure cylinder ca be eliminated, and a damage to a passage communicating between the accommodation part and the first fluid chamber of the fluid-pressure cylinder can be prevented, and drifting of the machine body due to the damage can be prevented.

According to the third aspect of the present invention, sealability as well as manufacturability of the drift-prevention valve device can be improved by forming the valve element of the non-return valve and the power piston as a separate construction from each other.

According to the fourth aspect of the present invention, by making the non-return valve to serve as a pilot operated non-return valve in which a back pressure chamber, which accommodates the urging member and further can be supplied with the first fluid chamber pressure of the fluid-pressure cylinder, is defined in the accommodation part, the operation of the valve element of the non-return valve can be controlled more finely using the first fluid chamber pressure of the fluid-pressure cylinder.

According to the fifth aspect of the present invention, a relief valve opens when an overload is applied to the first fluid chamber of the fluid-pressure cylinder, and the selector valve is pilot-operated by the working fluid from the first fluid chamber of the fluid-pressure cylinder flowing out from the relief valve, and is switched over to a position for allowing communication between the back pressure chamber and the tank, thereby the valve element can be moved in the valve opening direction by releasing back pressure in the non-return valve and the overload can be released by returning the working fluid from the first fluid chamber to the tank via the control valve.

According to the sixth aspect of the present invention, by providing a fuse valve in a balance line communicating between the first fluid chambers of paired fluid-pressure cylinder, for example, when the balance line is damaged, the front-rear differential pressure of the fuse valve reaches a predetermined pressure that has been determined in advance to close the fuse valve, thereby the working fluid can be prevented from flowing out from the first fluid chamber of the fluid-pressure cylinder via the balance line, and drifting of the machine body due to this outflow can be prevented.

According to the seventh aspect of the invention, it is made possible to communicate both the first fluid chamber and the second fluid chamber with the tank, because when attempting to communicate the first fluid chamber and the second fluid chamber of the fluid-pressure cylinder with the tank respectively via the control valves, by setting an area with which the power piston receives the second fluid chamber pressure of the fluid-pressure cylinder to be greater than an area with which the valve element of the non-return valve receives the first fluid chamber pressure of the fluid-pressure cylinder, a force which the power piston receives based on the second fluid chamber pressure exceeds a force which the valve element of the non-return valve receives based on the first fluid chamber pressure, and the valve element of the non-return valve can be moved in the valve opening direction by the power piston. Consequently, a float function can be easily imparted to the fluid-pressure cylinder.

According to the eighth aspect of the invention, it is made possible to move the blade upward and downward and prevent the occurrence of drifting in the machine body supported by a reaction force of the blade being in contact with the ground with a simple configuration, without the need to newly add a pilot line or the like from the control valve side, by mounting the drift-prevention valve device according to any one of the first to seventh aspects on the fluid-pressure cylinder that moves the blade serving as an actuated unit upward and downward.

According to the ninth aspect of the invention, a working machine can be provided capable of moving the blade upward and downward and preventing the occurrence of drifting of the machine body supported by the reaction force of the blade being in contact with the ground with a simple configuration, by providing the blade device according to the eighth aspect.

According to the tenth aspect of the present invention, it is made possible to move the blade upward and downward and prevent the occurrence of drifting of the machine body supported by the reaction force of the blade being in contact with the ground with a simple configuration, without the need to newly add ports such as pilot lines to a swivel joint.

EMBODIMENTS OF THE INVENTION

Figure 1:
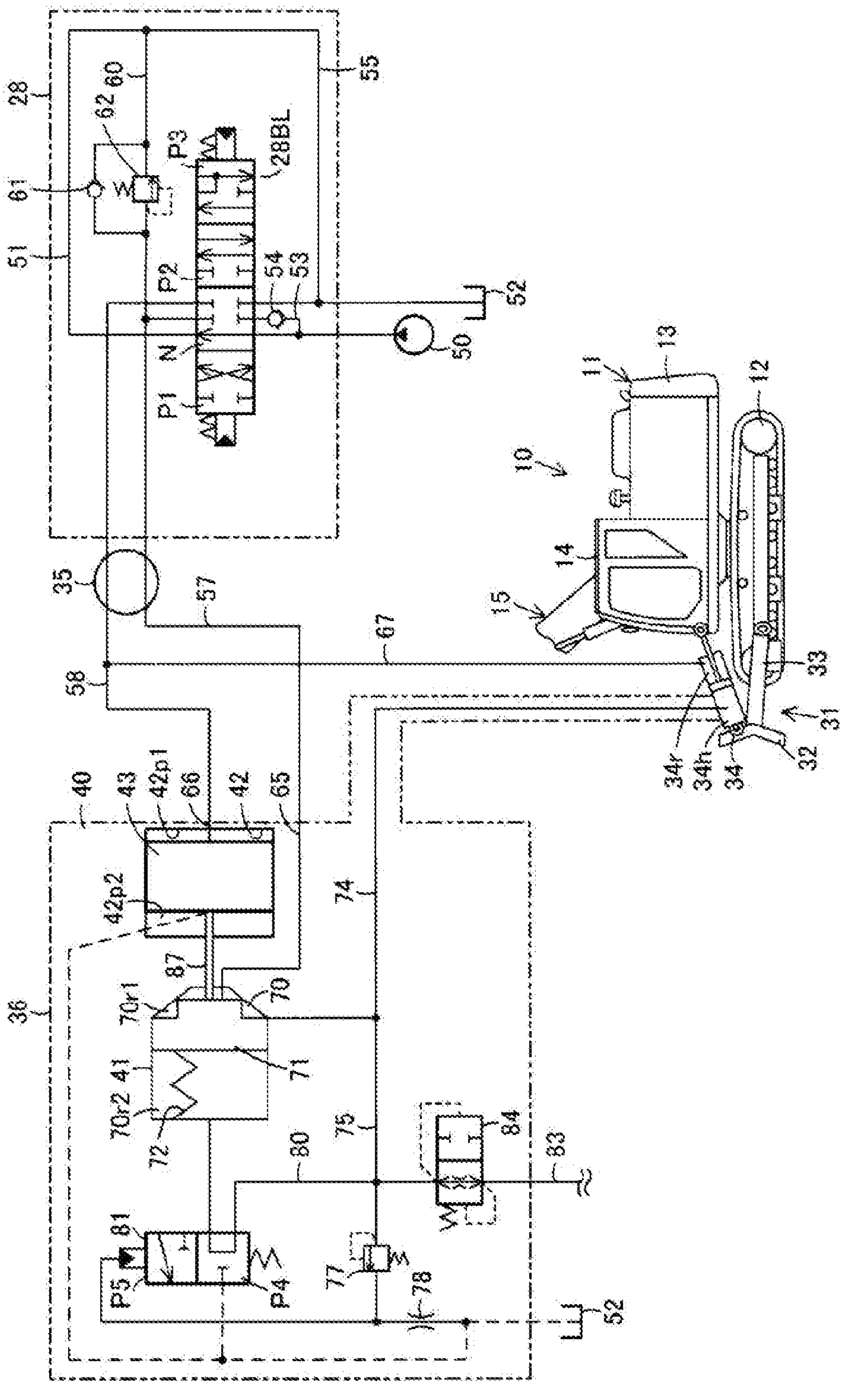
FIG. 1 is a fluid-pressure circuit diagram with a blade being at a neutral position illustrating one embodiment of a working machine equipped with a blade device having a drift-prevention valve device according to the present invention.

Hereinbelow, the present invention will be described in detail based on one embodiment illustrated in FIG. 1 to FIG. 7.

In FIG. 1 to FIG. 6, a reference numeral 10 denotes a working machine. The working machine 10 of the present embodiment will be described, taking a hydraulic shovel type working machine as an example.

The working machine 10 includes a machine body 11. The machine body 11 is, in the present embodiment, configured such that an upper swing body 13 is provided so as to be swingable on a lower traveling body 12. The lower traveling body 12 may be a wheel type or a crawler belt type, and is driven by a traveling motor. The upper swing body 13 is driven by a swing motor. The machine body 11 includes a cab 14. The cab 14 is mounted on the upper swing body 13.

In addition, a working equipment 15 is supported by the machine body 11. The working equipment 15 includes a boom whose base end is joint connected to the upper swing body 13 so as to be freely rotatable in the vertical direction, an arm serving as a stick that is joint connected to a distal end of the boom, and a bucket that is joint connected to the distal end of the arm. The boom is rotated by a boom cylinder serving as a fluid-pressure cylinder, the arm is rotated by an arm cylinder serving as a fluid-pressure cylinder, and the bucket is rotated by a bucket cylinder serving as a fluid-pressure cylinder, Hydraulic oil as working fluid is supplied to and discharged from the boom cylinder, the arm cylinder, and the bucket cylinder via a control valve 28 as a control valve via a piping. The control valve 28 is mounted on the upper swing body 13.

Figure 7:
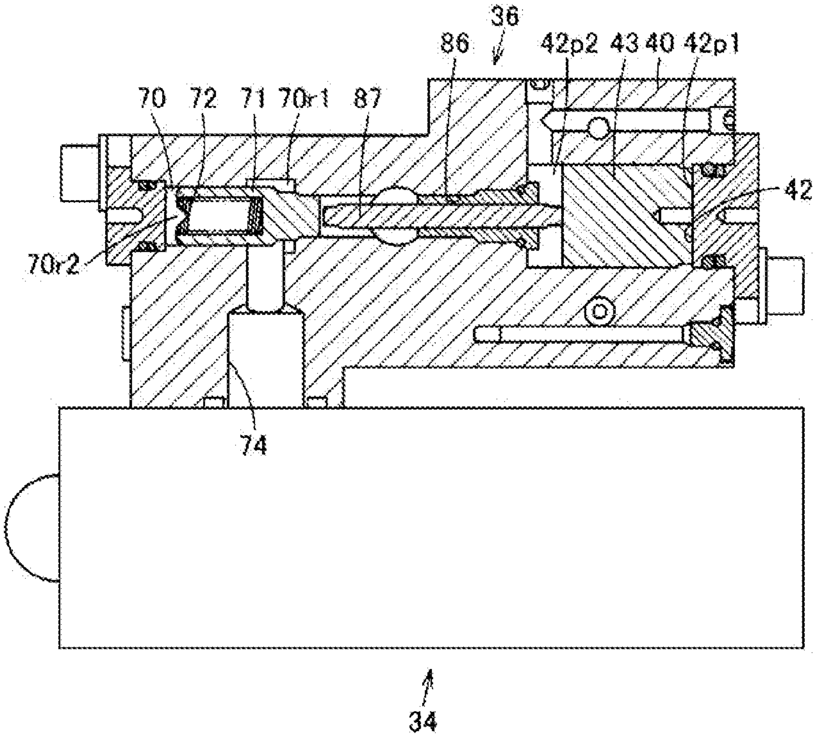
FIG. 7 is a cross-sectional view illustrating the same drift-prevention valve device as above.

Then, a blade device 31 is provided on the machine body 11. The blade device 31 is a lower supporting device provided in the lower traveling body 12. The blade device 31 is equipped with a blade 32 that is an actuated unit extending in a vehicle width direction serving as an earth removing body, a connecting arm 33 that rotatably supports the blade 32 with respect to the lower traveling body 12 of the machine body 11, and a blade cylinder 34 serving as a fluid-pressure cylinder. In the present embodiment, the connection arm 33 and the blade cylinder 34 are provided, for example, each in a right-and-left pair. The hydraulic oil is supplied to and discharged from the blade cylinder 34 from the control valve 28 via a swivel joint 35. The swivel joint 35 is disposed at the swing center of the upper swing body 13. Further, a drift-prevention valve device 36 is mounted on the blade cylinder 34. The drift-prevention valve device 36 includes a single block-shaped valve main body 40 that is directly mounted on the blade cylinder 34, as illustrated in FIG. 7. A non-return valve 41, a piston accommodation part 42, and a power piston 43 are incorporated in the valve main body 40.

A hydraulic system serving as a fluid-pressure system as illustrated in FIGS. 1 to 6 is mounted on the working machine 10.

A main pump 50 serving as a fluid-pressure pump mounted on the machine body 11 is driven by an engine mounted on the machine body 11. The main pump 50 is connected to a tank 52 through a center bypass passage 51 provided in the control valve 28, and is designed such that a flow rate of the hydraulic oil to be returned to the tank 52 through the center bypass passage 51 from the main pump 50 be reduced depending on a displacement quantity of a control spool 50 of the control valve 28. In the control valve 28, a check valve 54 is provided in a supply passage 53 branched from the center bypass passage 51. In the control valve 28, there is provided a return passage 55 connected to the center bypass passage 51 and connected to the tank 52. In the control valve 28, there are provided connection passages 57 and 58 that are connected to respective actuators such as the left and, right traveling motors, the swing motors, the boom cylinders, the arm cylinders, the bucket cylinders, and the blade cylinders 34. In the present embodiment, there is provided a line relief valve 62 including a check valve 61 for a make-up check (negative pressure prevention), in a passage 60 connecting between the connection passage 57 and the center bypass passage 51.

In the control valve 28 of the present embodiment, a control spool, the traveling motor, the swing motor, the boom cylinder, the arm cylinder, and the bucket cylinder can use a known product and therefore their illustrations will be omitted, and only the control spool 28BL for the blade cylinder 34 will be illustrated. Here, the control spool 28BL allows a displacement direction and a displacement amount to be controlled according to an operation direction and an operation amount of a pilot valve associated with an operation of an operation unit, for example, such as a lever or a pedal disposed in the cab 14, and executes direction control and flow rate control of the hydraulic oil supplied to and discharged from a head chamber 34*h* being a first fluid chamber and a rod chamber 34*r* being a second fluid chamber of the blade cylinder 34 from the main pump 50, and is displaced so as to increase the flow rate of the hydraulic oil as the operation amount increases. The control spool 28BL, in the present embodiment, includes a neutral position N, operating positions P1 and P2, and a float position P3. The control spool 28BL is located at the neutral position N that does not allows the pressurized oil to be supplied to the blade cylinder 34, while no pilot pressure is being supplied. The control spool 28BL is configured to be switched over to the operating positions P1 and P2 that allow the oil discharged from the main pump 50 to be supplied to and discharged from the head chamber 34*h* and the rod chamber 34*r* of the blade cylinder 34, or to a float position P3 that allows the head chamber 34*h* and the rod chamber 34*r* of the blade cylinder 34 to be connected to the tank 52, by the pilot pressure being supplied. In this case, the displacement amount (travel stroke) of the control spool 28BL increases or decreases corresponding to increase or decrease of pilot pressures being input, and is controlled so that the larger the displacement amount, the larger the passing oil amount becomes, that is, the larger the valve opening degree becomes.

The connection passages 57 and 58 are usually connected to actuators via the swivel joint 35; however, in the present embodiment, they are connected to the drift-prevention valve device 36 mounted on the blade cylinder 34.

In the present embodiment, the connection passage 57 is connected to a passage 65 of the drift-prevention valve device 36, and the connection passage 58 is connected to a passage 66 of the drift-prevention valve device 36, and further is directly connected to the rod chamber 34*r* of the blade cylinder 34 via a branch passage 67.

The passage 65 of the drift-prevention valve device 36 is connected to a non-return valve 41. The non-return valve 41 is configured such that a poppet 71 serving as a valve element, is movably accommodated in an accommodation part 70 formed within a valve main body 40, and the poppet 71 is urged by a spring 72 serving as an urging member toward a valve closing direction, that is, toward a valve seat. Inside the accommodation part 70, a valve seat chamber 70*r*1 that is communicated with the passage 65 including the valve seat and a back pressure chamber 70*r*2 are defined by the poppet 71. The passage 65 and a passage 74 are connected to the valve seal chamber 70*r*1 with the valve seat interposed therebetween. The passage 74 is formed in the valve main body 40 and is directly connected to the head chamber 34*h* of the blade cylinder 34. In addition, a communication passage 75 formed in the valve main body 40 is branched from the passage 74, and the communication passage 75 is connected to a tank 52 via a relief valve 77 and a throttle 78 provided in the valve main body 40. The relief valve 77 is set to open when the head chamber pressure of the blade cylinder 34 reaches a preset relief pressure.

A branch passage 80 formed in the valve main body 40 is branched from the communication passage 75, and a selective valve 81 is provided in the branch passage 80. In other words, the head chamber 34*h* of the blade cylinder 34 is communicated with the back pressure chamber 70*r*2 of the non-return valve 41 via the selective valve 81. The selective valve 81 is pilot operated by the hydraulic oil from the head chamber 34*h* of the blade cylinder 34 flowing out from the relief valve 7. The selective valve 81 can be switched over between a first position P4 that allows the back pressure chamber 70*r*2 of the non-return valve 41 and the head chamber 34*h* of the blade cylinder 34 to be communicated with each other, and a second position P5 that allows the back pressure chamber 70*r*2 and the tank 52 to be communicated with each other.

Further, a balance line 83 connected to the drift-prevention valve device 36 mounted on the blade cylinder 34 on the opposite side is branched from the communication passage 75, and a fuse valve 84 is provided on the balance line 83. In other words, the balance line 83 communicates between the head chambers 34*h* of a pair of blade cylinders 34. The balance line 83 is partially formed in the valve main body 40, and the section between the valve main body 40 of the drift-prevention valve device 36 on the opposite side and itself is formed by a piping, for example. The fuse valve 84 is used to block oil leakage from the head chamber 34*h* of the blade cylinder 34 when the balance line 83 is damaged. The fuse valve 84 is built in the valve main body 40 and is configured to close when a front-rear differential pressure reaches a predetermined pressure that has been determined in advance.

The passage 66 of the drift-prevention valve device 36 is connected to a piston accommodation part 42. The piston accommodation part 42 is formed in the valve main body 40 independently of the accommodation part 70 of the non-return valve 41. The piston accommodation part 42 accommodates movably a power piston 43, and further a first piston chamber 42*p*1 and a second piston chamber 42*p*2 are defined in the piston accommodation part 42, by the power piston 43. The first piston chamber 42*p*1 is connected to the passage 66. Accordingly, the first piston chamber 42*p*1 is connected to the rod chamber 34*r* of the blade cylinder 34 via the passage 66, the connection passage 58, and the branch passage 67. A pressure receiving area of the power piston 43 which is the surface area of the power piston 43 facing the first piston chamber 42*p*1 is considerably larger than a pressure receiving area of the poppet 71 which is the surface area of the poppet 71 facing the back pressure chamber 70*r*2. The second piston chamber 42*p*2 is located on the poppet 71 side (left side in the figure) of the non-return valve 41 with respect to the power piston 43, and is used for drain purpose communicating with the tank 52 on the downstream side of the throttle 78. Therefore, although hydraulic pressure acts on the power piston 43 in the direction toward the non-return valve 41 side (the poppet 71 side) in the piston accommodation part 42, the power piston 43 is configured so as not to receive such a reaction force from the opposite direction, i.e., not to basically generate pressure. As illustrated in FIG. 7, the second piston chamber 42*p*2 is communicated with the valve seat chamber 70*r*1 of the accommodation part 70 of the non-return valve 41 via a communication part 86 formed in the valve main body 40. In the communication part 86, there is disposed a connecting rod 87 serving as a connecting member for transmitting the movement of the power piston 43 to the poppet 71 to interlock the movement of the poppet 71 with the movement of the power piston 43. The connecting rod 87 is formed as a separate construction from the power piston 43 and the poppet 71. Also, the connecting rod 87 is formed to be long, and an area of an end face of the connecting rod 87 opposed to the power piston 43 and poppet 71 with respect to the power piston 43 and poppet 71 is set smaller.

Next, an operation of the illustrated embodiment will be described.

[Blade at Neutral]

In case where an operator places the operation unit at a neutral position, as illustrated in FIG. 1, when the control spool 28BL of the control valve 28 is positioned at a neutral position N, the main pump 50 is connected to the center bypass passage 51, and the non-return valve 41 moves the poppet 71 in the valve closing direction by the urging force of the spring 72 to abut against the valve seat, and cuts off a connection between the ports communicating with the passage 65 and the passage 74 respectively. For this reason, the hydraulic oil discharged from the main pump 50 is returned to the tank 52 by way of the center bypass path 51, and thus the hydraulic oil is no longer supplied to the blade cylinder 34, and the blade cylinder 34 maintains the current status without performing expanding/contracting operation.

[Lifting Up Blade]

Figure 2:
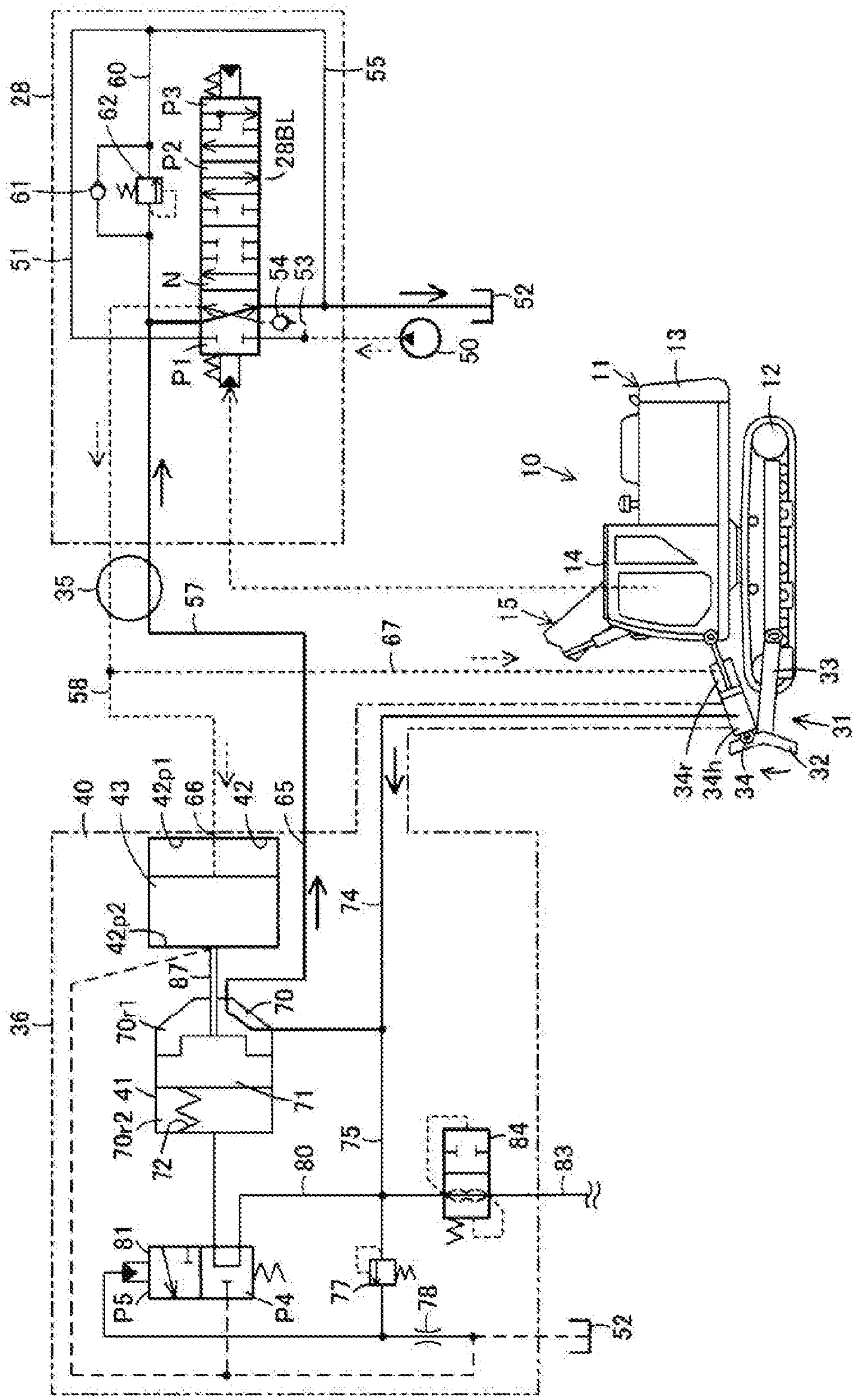
FIG. 2 is a fluid-pressure circuit diagram during a raising operation of the blade illustrating the same working machine as above.

In case where the operator operates the operation unit in a blade lifting direction, as illustrated in FIG. 2, the control spool 28BL of the control valve 28 is switched to the operating position P1, and the main pump 50 is connected to the connection passage 58 via the check valve 54 of the supply passage 53, and the connection passage 57 is connected to the tank 52 via the return passage 55. For this reason, the hydraulic oil discharged from the main pump 50 is supplied to the rod chamber 34*r* of the blade cylinder 34 through the branch passage 67 from the connection passage 58, according to an operation amount of the control spool 28BL, and further is supplied to the first piston chamber 42*p*1 of the piston accommodation part 42 from the passage 66 of the drift prevention valve device 36. As a result, the power piston 43 is pushed and moved toward an closer side (the left side in the figure) to the non-return valve 41 by a rod side pressure (pump pressure), and the poppet 71 of the non-return valve 41 is pushed against the urge of the spring 72 via the connecting rod 87, and is moved forcibly and thereby the valve seat is opened to allow the passage 65 and the passage 74 to be communicated with each other, and the connection passage 57 is connected to the head chamber 34*h* of the blade cylinder 34 through the passage 65, the passage 74, and the hydraulic oil is returned to the tank 52 from the head chamber 34*h*. Therefore, the blade cylinder 34 is contracted and the blade 32 is subjected to lifting operation. In this state, when the operator returns the operation unit to the neutral position, the hydraulic oil in the head chamber 34*h* and the rod chamber 34*r* of the blade cylinder 34 is not increased or decreased, and the blade 32 maintains the lifted position.

(Lowering Blade and Raising Machine Body 11)

Figure 3:
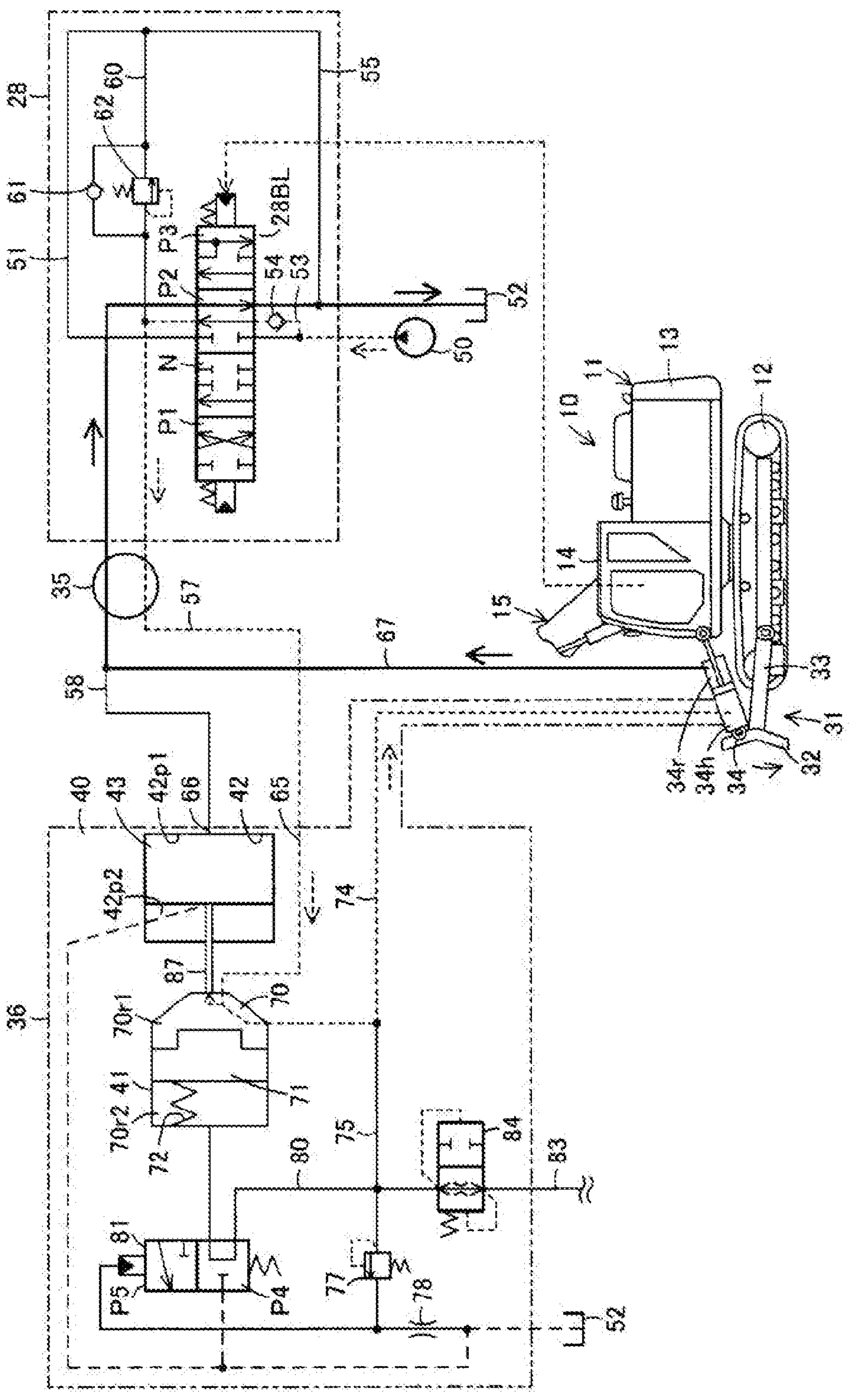
FIG. 3 is a fluid-pressure circuit diagram during a lowering operation of the blade illustrating the same working machine as above.

In case where the operator operates the operation unit in a blade lowering direction, as illustrated in FIG. 3, the control spool 28BL of the control valve 28 is switched over to the operating position P2, the main pump 50 is connected to the connection passage 57 via the check valve 54 of the supply passage 53, and the connection passage 58 is connected to the tank 52 via the return passage 55. For this reason, the hydraulic oil discharged from the main pump 50 is supplied to the valve seat chamber 70*r*1 of the non-return valve 41 via the passage 65 of the drift-prevention valve device 36 from the connection passage 57, according to an operation amount of the control spool 28BL, and the poppet 71 is pushed in and moved against the urge of the spring 72, the valve seat is opened to allow the passage 65 and the passage 74 to be communicated with each other, the connection passage 57 is connected to the head chamber 34*h* of the blade cylinder 34 via the passage 65 and the passage 74, and the hydraulic oil is supplied from the main pump 50 to the head chamber 34*h* of the blade cylinder 34. The connecting rod 87 is separated from the poppet 71. Further, from the rod chamber 34*r* of the blade cylinder 34, a connection is established to the tank 52 through the branch passage 67, the connection passage 58, and the return passage 55, and the hydraulic oil is returned to the tank 52 from the rod chamber 34*r*. Therefore, the blade cylinder 34 is extended and the blade 32 is caused to perform lowering operation. Therefore, the machine body 11 can be raised, by causing the blade 32 to perform lowering operation as described above, with the blade 32 being brought into contact with the ground. In this state, when the operator returns the operating unit to the neutral position, the hydraulic oil in the head chamber 34*h* and the rod chamber 34*r* of the blade cylinder 34 is not increased or decreased, and the blade 32 maintains the lowering position.

(Blade Float)

Figure 4:
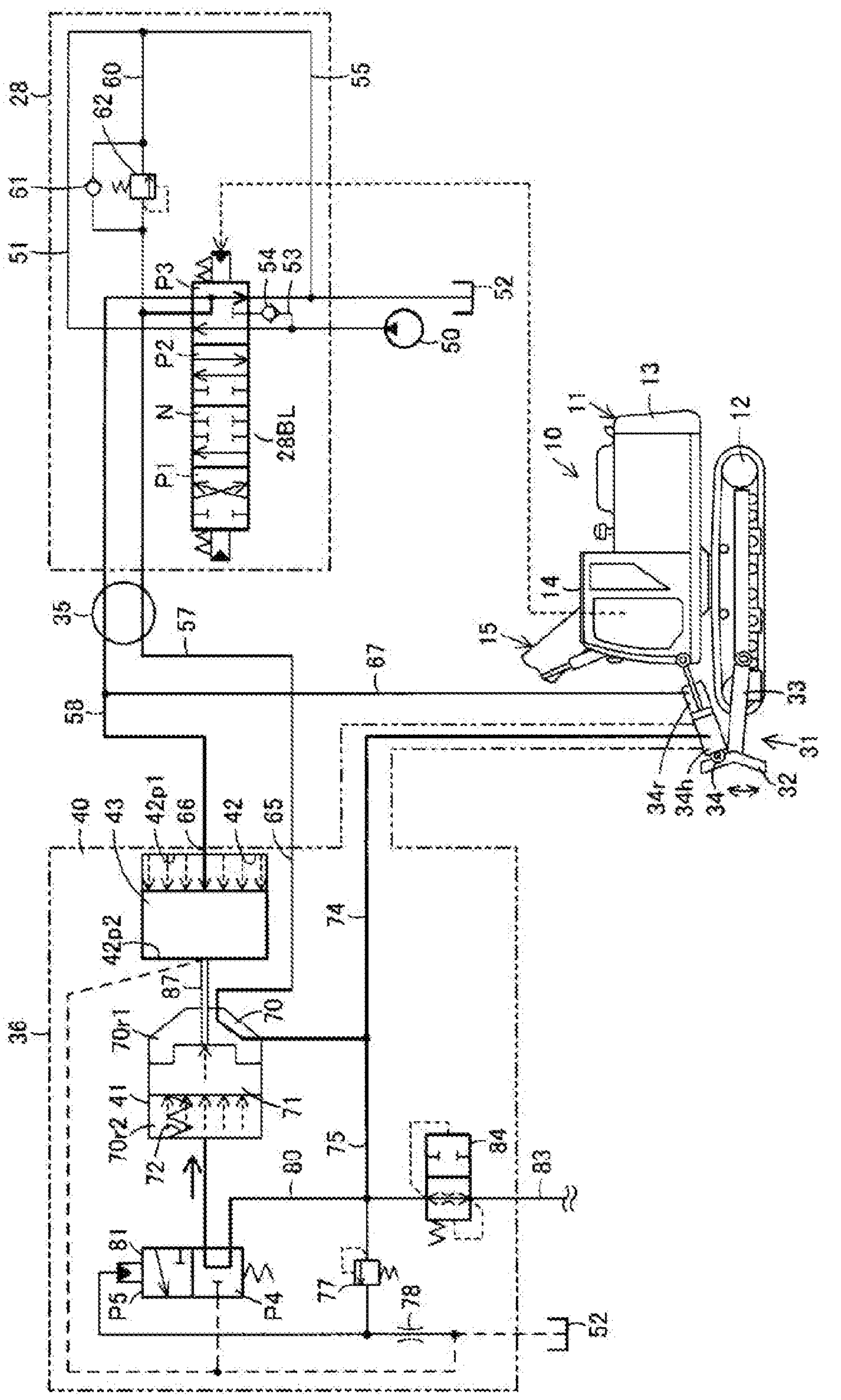
FIG. 4 is a fluid-pressure circuit diagram during a float operation of the blade illustrating the same working machine as above.

If the operator switches over the operating unit to a float position, as illustrated in FIG. 4, then the control spool 28BL of the control valve 28 is switched over to a float position P3, and the main pump 50 is connected to the center bypass passage 51, and further the passages 57 and 58 are connected to the tank 52, respectively. In other words, the rod chamber 34*r* of the blade cylinder 34 is communicated with the tank 52 through the connection passage 58 and the return passage 55. At this time, while the rod chamber pressure (tank pressure) of the blade cylinder 34 is supplied to the first piston chamber 42*p*1 of the power piston 43, the head chamber pressure of the blade cylinder 34 acts on the back pressure chamber 70*r*2 of the non-return valve 41. However, since the pressure receiving area of the power piston 43 is considerably larger than the pressure receiving area of the poppet 71, the pressure applied to the power piston 43 exceeds the sum of the urging force of the spring 72 and the back pressure of the poppet 71 even with a slight tank pressure. Consequently, the power piston 43 is pushed in and moved to the side closer to the non-return valve 41 (left side in the figure), and the poppet 71 of the non-return valve 41 is pushed in and moved forcibly against the urge of the spring 72 via the connecting rod 87. For that reason, the valve seat of the non-return valve 41 is opened, allowing the passage 65 and the passage 74 to be communicated with each other, and the head chamber 34*h* of the blade cylinder 34 to be also connected to the tank 52 through the connection passage 57 and the return passage 55. As a result, the head chamber 34*h* and the rod chamber 34*r* of the blade cylinder 34 are together connected to the tank 52 with no pressure acting on them, so that the hydraulic oil can freely move between the head chamber 34*h* and the rod chamber 34*r*. Consequently, the blade 32 enters a float state where it can freely move upward and downward by the weight of the working machine 10 without being fixed. By using this float function, the ground can be leveled by the weight of the working machine 10, for example.

(When Piping is Damaged and when Balance Line is Damaged)

Figure 5:
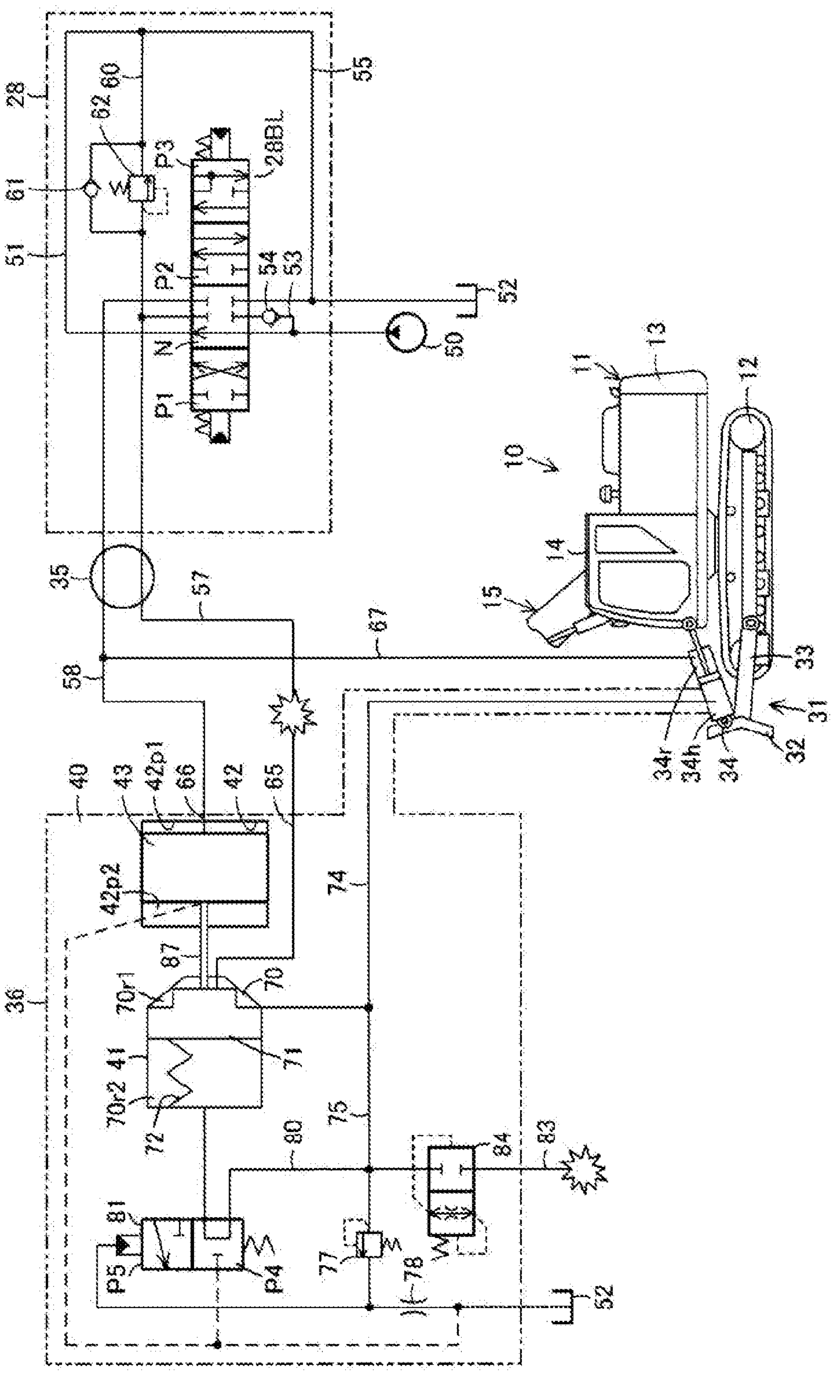
FIG. 5 is a fluid-pressure circuit diagram during a damage in piping illustrating the same working machine as above.

For example, supposing that the connection passage 57 is damaged, as illustrated in FIG. 5, the poppet 71 of the non-return valve 41 maintains abutment on the valve seat by the urging force of the spring 72, and maintain a state in which communication between the passage 65 and the passage 74 is cut off. Thus, the head chamber 34*h* of the blade cylinder 34 is prevented from being connected to the connection passage 57, and the hydraulic oil in the head chamber 34*h* is prevented from leaking to the outside of the hydraulic system from the damaged portion in the connection passage 57, thereby preventing the blade cylinder 34 from being contracted. For that reason, even supposing that the connection passage 57 is damaged while the blade 32 is brought into contact with the ground, and the machine body 11 is raised and supported, the machine body 11 can be prevented from being drifted due to the contraction of the blade cylinder 34. Supposing that the connection passage 58 is damaged, the hydraulic oil in the rod chamber 34*r* of the blade cylinder 34 may leak to the outside of the hydraulic system from the damaged portion in the connection passage 58. Such a leakage, however, acts in a direction in which the blade cylinder 34 is extended, and does not lead to the contraction of the blade cylinder 34, and consequently to the drifting of the machine body 11.

Also, for example, supposing that the balance line 83 is damaged, a front-rear differential pressure of the fuse valve 84 provided in the balance line 83 will increase, and thereby the fuse valve 84 will close, and the head chamber 34*h* of the blade cylinder 34 is cut off with respect to the balance line 83. As a result, this will prevent the hydraulic oil in the head chamber 34*h* of the blade cylinder 34 from leaking to the outside of the hydraulic system from the balance line 83. For that reason, even supposing that the balance line 83 is damaged while the blade 32 is brought into contact with the ground and the machine body 11 is being raised and supported, drifting of the machine body 11 due to the contraction of the blade cylinder 34 can be suppressed.

(During Overloading)

Figure 6:
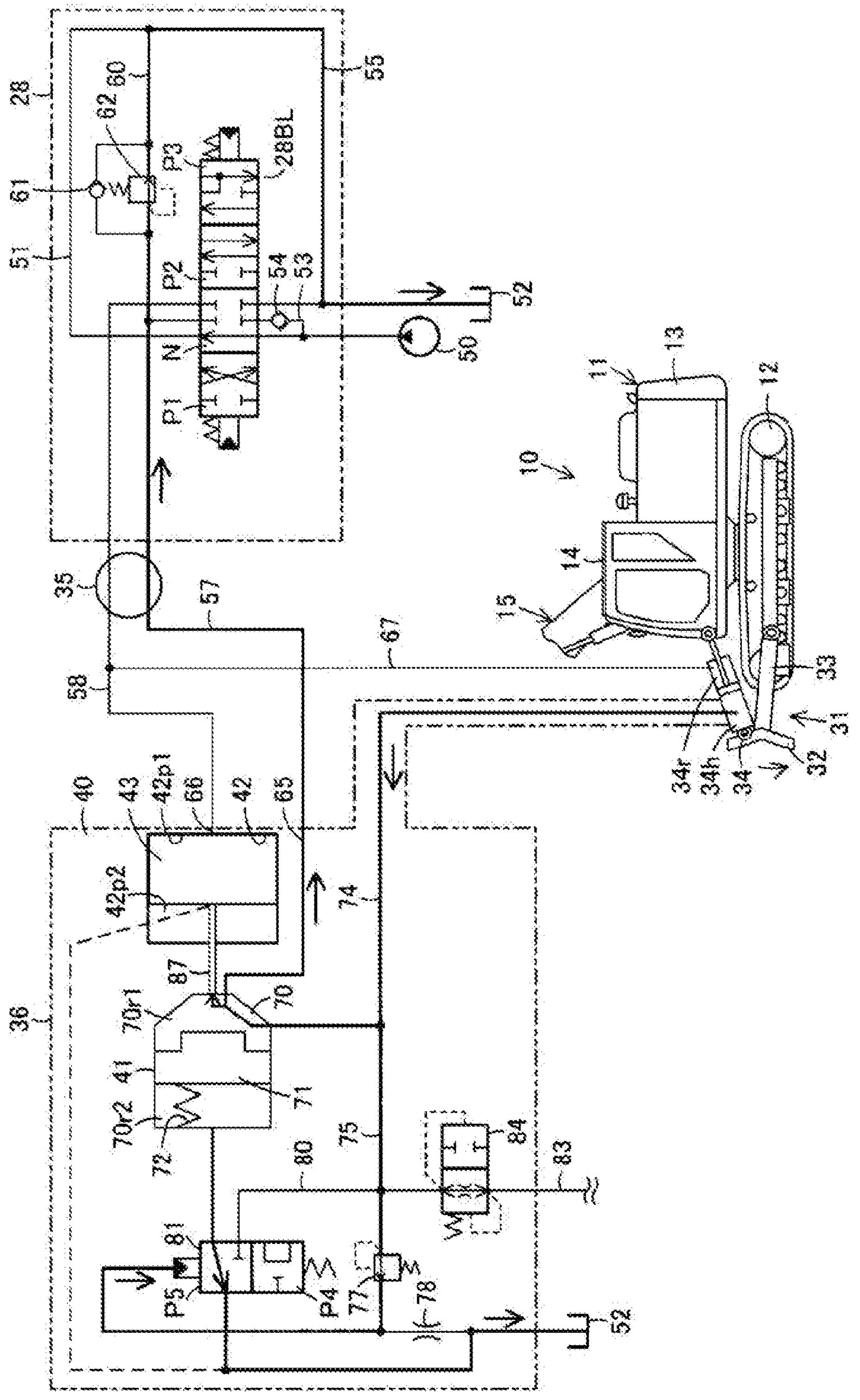
FIG. 6 is a fluid-pressure circuit diagram during a relief of an overload illustrating the same working machine as above.

For example, when an overload is exerted on the blade 32, as illustrated in FIG. 6, even supposing that the control spool 28BL of the control valve 28 is at the neutral position N, as the head chamber 34*h* of the blade cylinder 34 reaches a predetermined pressure, a relief valve 77 is opened, and the selector valve 81 is pilot operated by the hydraulic oil from the head chamber of 34*h* of the blade cylinder 34 flowing out from the relief valve 77, and is switched over from the first position P4 to the second position P5. As a result, the back pressure chamber 70*r*2 of the non-return valve 41 and the tank 52 are communicated with each other. For that reason, the back pressure of the non-return valve 41 is released, the poppet 71 is forcibly moved in the valve opening direction against the bias of the spring 72 by the head chamber pressure of the blade cylinder 34, the valve seat is opened, allowing the passage 65 and the passage 74 to be communicated with each other, and the head chamber 34*h* of the blade cylinder 34 is connected to the connection passage 57 via the passage 74 and the passage 65. Therefore, the pressurized oil from the head chamber 34*h* is returned from the connection passage 57 to the tank 52 through the center bypass passage 51 by opening the line relief valve 62 of the passage 60, thereby releasing the overload and preventing a damage of the blade cylinder 34 or the piping.

Next, the advantageous effects of the illustrated embodiment will be listed.

The power piston 43 on which no hydraulic pressure acts from the second piston chamber 42*p*2 on the poppet 71 side of the non-return valve 41 is connected to the poppet 71 of the non-return valve 41. Accordingly, when the hydraulic oil is supplied from the control valve 28 to the rod chamber 34*r* side of the blade cylinder 34, the rod chamber pressure of the blade cylinder 34 exceeds an urging force acting on the poppet 71 by the spring 72 of the non-return valve 41, and thereby the poppet 71 of the non-return valve 41 is moved in the valve opening direction by the power piston of 43, and the hydraulic oil can be discharged to the control valve 28 from the head chamber 34*h* of the blade cylinder 34. Further, for example, in an event of producing a damage to a passage communicating between the accommodation part 70 of the non-return valve 41 and the control valve 28, e.g. the connection passage, the poppet 71 of the non-return valve 41 is retained in valve closing direction by the urging force of the spring 72, thereby preventing the hydraulic oil from being discharged from the head chamber 34*h* of the blade cylinder 34 to the control valve 28, so that the blade 32 is not released from supporting the machine body 11. Accordingly, it is made possible to actuate the blade 32 and prevent drifting of the machine body 11 supported by the blade 32 with a simple configuration, without the need to newly add a pilot line or the like from the control valve 28 side.

By directly mounting the valve main body 40 incorporating the non-return valve 41, the piston accommodation part 42, and the power piston 43 on the blade cylinder 34, and by forming therein the passage 74 directly communicating between the accommodation part 70 of the non-return valve 41 and the head chamber 34*h* of the blade cylinder 34, piping for connecting between the accommodation part 70 and the head chamber 34*h* of the blade cylinder 34 can be eliminated and damage to the passage 74 communicating between the accommodation part 70 and the head chamber 34*h* of the blade cylinder 34 can be prevented, thereby the drifting of the machine body 11 due to this damage can be prevented.

By forming the poppet 71 of the non-return valve 41 and the power piston 43 as a separate body from each other, sealability as well as manufacturability of the drift-prevention valve device 36 can be improved.

By designing the non-return valve 41 as a pilot non-return valve that defines the back pressure chamber 70*r*2, which accommodates the spring 72 and further can be supplied with a head chamber pressure of the blade cylinder 34, in the accommodating part 70, the head chamber pressure of the blade cylinder 34 can be used to control more finely the actuation of the poppet 71 of the non-return valve 41. Further, because a pilot pressure for actuating the non-return valve 41 can use the head chamber pressure of the blade cylinder 34, and a passage for that purpose can be formed inside the valve main body 40, additional piping needs not to be routed from the upper swing body 13 side, even when the non-return valve 41 is a pilot operated non-return valve.

When an overload is applied to the head chamber 34*h* of the blade cylinder 34, the relief valve 77 opens, the selector valve 81 is pilot operated by the hydraulic oil from the head chamber 34*h* of the blade cylinder 34 flowing out from the relief valve 77 and is switched over to the second position P5 that allows communicating between the back pressure chamber 70*r*2 and the tank 52, thereby the back pressure of the non-return valve 41 can be released and the poppet 71 can be moved in the valve opening direction, and the hydraulic oil is returned to the tank 52 via the control valve 28 from the head chamber 34*h* to release the overload.

By providing the fuse valve 84 in the balance line 83 that communicates between the paired head chambers 34*h* of the blade cylinders 34, when the balance line 83 is damaged, for example, the front-rear differential pressure across the fuse valve 84 reaches a predetermined pressure that has been predetermined in advance, thereby the fuse valve 84 is closed and the hydraulic oil can be prevented from flowing out from the head chamber 34*h* of the blade cylinder 34 via the balance line 83, and drifting of the machine body 11 due to this oil outflow can be prevented.

When an attempt is made to communicate both the head chamber 34*h* and the rod chamber 34*r* with the tank 52 via the control valve 28 respectively, by setting an area with which the power piston 43 receives the rod chamber pressure of the blade cylinder 34 to be larger than an area with which the poppet 71 of the non-return valve 41 receives the head chamber pressure of the blade cylinder 34, a force which the power piston 43 receives from the rod chamber pressure exceeds a force which the poppet 71 of the non-return valve 41 receives from the head chamber pressure, and the poppet 71 of the non-return valve 41 can be moved in the valve opening direction by the power piston 43. As a result, it is made possible to communicate both the head chamber 34*h* and the rod chamber 34*r* with the tank 52. For this reason, it is made possible to easily impart a float function to the blade cylinder 34.

Further, the drift-prevention valve device 36 is structured such that all structures and passages are incorporated in the inside of the valve main body 40, and the structure is complete in the inside of the valve main body 40, and as a result, additional piping can be minimized, and the drift-prevention valve device 36 can be easily mounted more on the general working machines not having the drift prevention valve device 36.

By mounting the drift-prevention valve device 36 on the blade cylinder 34 for moving the blade 32 upward and downward, it is made possible to move the blade 32 upward and downward and prevent drifting of the machine body 11 supported by the reaction force of the blade 32 being brought into contact with the ground with a simple configuration, without the need to newly add a pilot line or the like from the control valve 28 side.

The present invention can provide the working machine 10 that is capable of moving the blade 32 upward and downward and preventing drifting of the machine body 11 supported by a reaction force of the blade 32 being brought into contact with the ground, with a simple configuration, without the need to add ports such as a pilot line to the swivel joint 35 that will be required when the hydraulic oil is supplied from the control valve 28 located in the upper swing body 13 to the blade cylinder 34 of the blade device 31 located in the lower traveling body 12, by providing with the blade device 31 described above, in the working machine 10. For that reason, the working machine 10 can be manufactured at a low cost, without causing the increase of cost or change of layout for manufacturing the dedicated swivel joint 34, and becomes readily applicable to conventional working machines. Especially in case of the blade device 31 located at the lower traveling body 12 close to the ground, it is desirable to reduce piping as much as possible, in order to reduce the possibility of damage caused by, for example such as jumping rocks. Therefore, the working machine 10 with high reliability can be provided, which has suppressed additional piping or the like, while preventing drifting of the machine body 11, by applying the aforementioned drift-prevention valve device 36 and the blade device 31.

In one embodiment described above, the drift-prevention valve device 36 may be applied to, for example, an outrigger cylinder serving as a fluid-pressure cylinder that activates an outrigger serving as an activated unit and stabilizes the machine body 11. In other words, even in an outrigger device serving as a lower supporting device provided in the lower traveling body 12, supplied with the hydraulic oil via the swivel joint 35, similarly to the blade device 31, because there arises a problem of preventing drifting of the machine body 11 without adding new ports for separate hydraulic line or a pilot line to the swivel joint 35, in consideration of the cost and layout, the drift-prevention valve device 36 described above can be suitably used.

Further, the drift-prevention valve device 36 may be applied to a fluid-pressure cylinder such as a boom cylinder for raising the machine body 11 by pressing the bucket of the working equipment 15 as an actuated unit of the working machine 10 against the ground. When raising the machine body 11 by pressing the working equipment 15 against the ground, the same interaction effect can be obtained by connecting the head chamber and the rod chamber of the fluid-pressure cylinder reversely to one embodiment, with respect to the drift-prevention valve device 36, because the machine body 11 may be lowered due to extension of the boom cylinder or the like. Therefore, depending on the hydraulic system, the first fluid chamber may be a head chamber or a rod chamber, and the second fluid chamber may be a rod chamber or a head chamber.

INDUSTRIAL APPLICABILITY

The present invention provides an industrial applicability mainly for business operators that manufacture or sell hydraulic cylinders for blade devices used in working machines for example, such as hydraulic shovels, or working machines mounting these hydraulic cylinders thereon.

The invention claimed is:

1. A drift-prevention valve device mounted on a fluid-pressure cylinder configured to actuate an actuated unit by being extended/contracted by supply/discharge of working fluid from a control valve to a first fluid chamber for supporting operation of a machine body by the actuated unit and a second fluid chamber opposed thereto, the drift-prevention valve device comprising:

a nonreturn valve including an accommodation part configured to communicate between the control valve and the first fluid chamber of the fluid-pressure cylinder, a valve element movably accommodated in the accommodation part, and an urging member for urging the valve element in a valve closing direction, configured to allow a flow of working fluid from the control valve to the first fluid chamber of the fluid-pressure cylinder and check the flow of the working fluid in the reverse direction;

a piston accommodation part provided separately from the accommodation part of the non-return valve; and a power piston movably accommodated in the piston accommodation part, configured to define in the piston accommodation part, a first piston chamber communicating with the second fluid chamber of the fluid-pressure cylinder and a second piston chamber for draining located on the valve element side of the nonreturn valve and communicating with the tank, and further connected to the valve element of the non-return valve, and further connected to the valve element of the non-return valve, and operable by a difference between an urging force of the valve element by the urging member of the nonreturn valve and a second fluid chamber pressure of the fluid-pressure cylinder.

2. The drift-prevention valve device according to claim 1, further comprising a valve main body incorporating the non-return valve, the piston accommodation part, and the power piston, and further including therein a passage configured to directly communicate between the accommodation part of the non-return valve and the first fluid chamber of the fluid-pressure cylinder, and directly mounted on the fluid-pressure cylinder.

3. The drift-prevention valve device according to claim 1, wherein the valve element of the non-return valve and the power piston are provided as a separate construction from each other.

4. The drift-prevention valve device according to claim 1, wherein the non-return valve is a pilot operated non-return valve that accommodates the urging member and further has in the accommodation part, a back pressure chamber that can be supplied with a first fluid chamber pressure of the fluid-pressure cylinder.

5. The drift-prevention valve device according to claim 4, further comprising:

a relief valve configured to open when the first fluid chamber pressure of the fluid-pressure cylinder reaches a preset relief pressure; and a selector valve configured to be switchable between a position for communicating between the back pressure chamber and the first fluid chamber of the fluid-pressure cylinder and a position for communicating between the back pressure chamber and the tank, by being pilot operated by the hydraulic oil from the first fluid chamber pressure of the fluid-pressure cylinder flowing out from the relief valve.

6. The drift-prevention valve device according to claim 4, wherein drift-prevention valve devices mounted on paired fluid-pressure cylinders respectively, the drift-prevention valve devices comprising:

a balance line communicating between the first fluid chambers of paired fluid-pressure cylinders, and a fuse valve provided in the balance line, configured to close when a front-rear differential pressure reaches a predetermined pressure that has been determined in advance.

7. The drift-prevention valve device according to claim 4, wherein an area with which the power piston receives the second fluid chamber pressure of the fluid-pressure cylinder is greater than an area with Which the valve element of the non-return valve receives the first fluid chamber pressure of the fluid-pressure cylinder.

8. A blade device comprising:

a blade serving as an actuated unit;

a connecting arm for joint connecting the blade to the machine body so as to be movable upward and downward;

a fluid-pressure cylinder including a head chamber serving as a first fluid chamber, and a rod chamber serving as a second fluid chamber, configured to move the blade upward and downward by its extension and contraction, the drift-prevention valve device according to claim 1 mounted on the fluid-pressure cylinder; and a control valve configured to control the direction and flow rate of the working fluid supplied and discharged to and from the head chamber and rod chamber of the fluid-pressure cylinder.

9. A working machine comprising:

a machine body; and the blade device according to claim 8 provided on the machine body.

10. The working machine according to claim 9, wherein the machine body comprising:

a lower traveling body including the blade connected thereto by the connecting arm of the blade device and the fluid-pressure cylinder disposed therein;

an upper swing body having the control valve of the blade device disposed therein and swingably provided on the lower traveling body; and a swivel joint disposed at the center of swing of the upper swing body, configured to connect the control valve to the drift-prevention valve device and the fluid-pressure cylinder respectively.

* * * * *